United States Patent
Sasaki et al.

(10) Patent No.: US 7,155,830 B2
(45) Date of Patent: Jan. 2, 2007

(54) PORTABLE WORKING MACHINE

(75) Inventors: Hideshi Sasaki, Wako (JP); Kenjiro Hiratsuna, Wako (JP); Hiroaki Uchitani, Wako (JP)

(73) Assignee: Honda Motor Co., Ltd. (JP)

( * ) Notice: Subject to any disclaimer, the term of this patent is extended or adjusted under 35 U.S.C. 154(b) by 92 days.

(21) Appl. No.: 10/984,312

(22) Filed: Nov. 9, 2004

(65) Prior Publication Data

US 2005/0115080 A1 Jun. 2, 2005

(30) Foreign Application Priority Data

Nov. 28, 2003 (JP) .............................. 2003-399709

(51) Int. Cl.
*B26B 19/02* (2006.01)

(52) U.S. Cl. .......................... 30/210; 30/208

(58) Field of Classification Search ................. 30/210, 30/401, 208; 173/162, 162.1; 968/309; 267/139; 192/112

See application file for complete search history.

(56) References Cited

U.S. PATENT DOCUMENTS

| | | | | |
|---|---|---|---|---|
| 3,134,585 A * | 5/1964 | Trask | ........................ | 267/143 |
| 4,856,194 A * | 8/1989 | Lee | ............................. | 30/276 |
| 5,543,609 A * | 8/1996 | Giordano et al. | ...... | 235/462.43 |
| 5,855,067 A * | 1/1999 | Taomo et al. | .................. | 30/122 |
| 6,917,517 B1 * | 7/2005 | Iida | ............................. | 361/683 |

FOREIGN PATENT DOCUMENTS

JP 09271233 10/1997

OTHER PUBLICATIONS

Newton, R.E. Chapter 31, Theory of Shock Isolation. Harris' Shock and Vibration Handbook (5th Edition) Edited by: Harris C.M.; Piersol, A.G. © 2002 McGraw-Hill. pp 31.1-31.3 and 31.8-31.12.*
Jones, David. Chapter 37, Applied Damping Treatments. Harris' Shock and Vibration Handbook (5th Edition) Edited by: Harris C.M.; Piersol, A.G. © 2002 McGraw-Hill. pp. 37.1, 37.19.*

* cited by examiner

*Primary Examiner*—Kenneth E. Peterson
*Assistant Examiner*—Sean M. Michalski
(74) *Attorney, Agent, or Firm*—Adams & Wilks (57) ABSTRACT

A portable working machine has a motive power source for producing a rotational motion, a cutting blade mounted to undergo linear reciprocating motion, and a reduction mechanism for reducing a speed of the rotational motion produced by the motive power source. A motion conversion mechanism converts the rotational motion reduced in speed by the reduction mechanism into a linear reciprocating motion of the cutting blade. A case accommodates therein the reduction mechanism and the motion conversion mechanism and has a lower surface. A cover member covers the lower surface of the case. The cover member has a first part connected to the lower surface of the case and a second part contiguous to the first part and extending to underlie a part of the lower surface of the case located below the reduction mechanism with a space defined between the part of the lower surface of the case and the second part of the cover member. An impact-absorbing member is disposed in the space between the part of the lower surface of the case and the second part of the cover member.

20 Claims, 10 Drawing Sheets

PORTABLE WORKING MACHINE

FIELD OF THE INVENTION

The present invention relates to a portable working machine for cutting garden plant or hedge.

BACKGROUND OF THE INVENTION

Portable working machines are known which comprise a motive power source carried on a case for producing a rotational motion, a reduction mechanism for reducing speed of the rotational motion from the motive power source, and a motion conversion mechanism for converting the rotational motion with reduced speed into a linear reciprocating motion of a cutting blade. The reduction mechanism and the motion conversion mechanism are mounted within the case, and the cutting blade projects from the case. One example of such a known portable working machine is disclosed in Japanese Patent Laid-Open Publication (JP-A) No. 09-271233.

Figure 12:
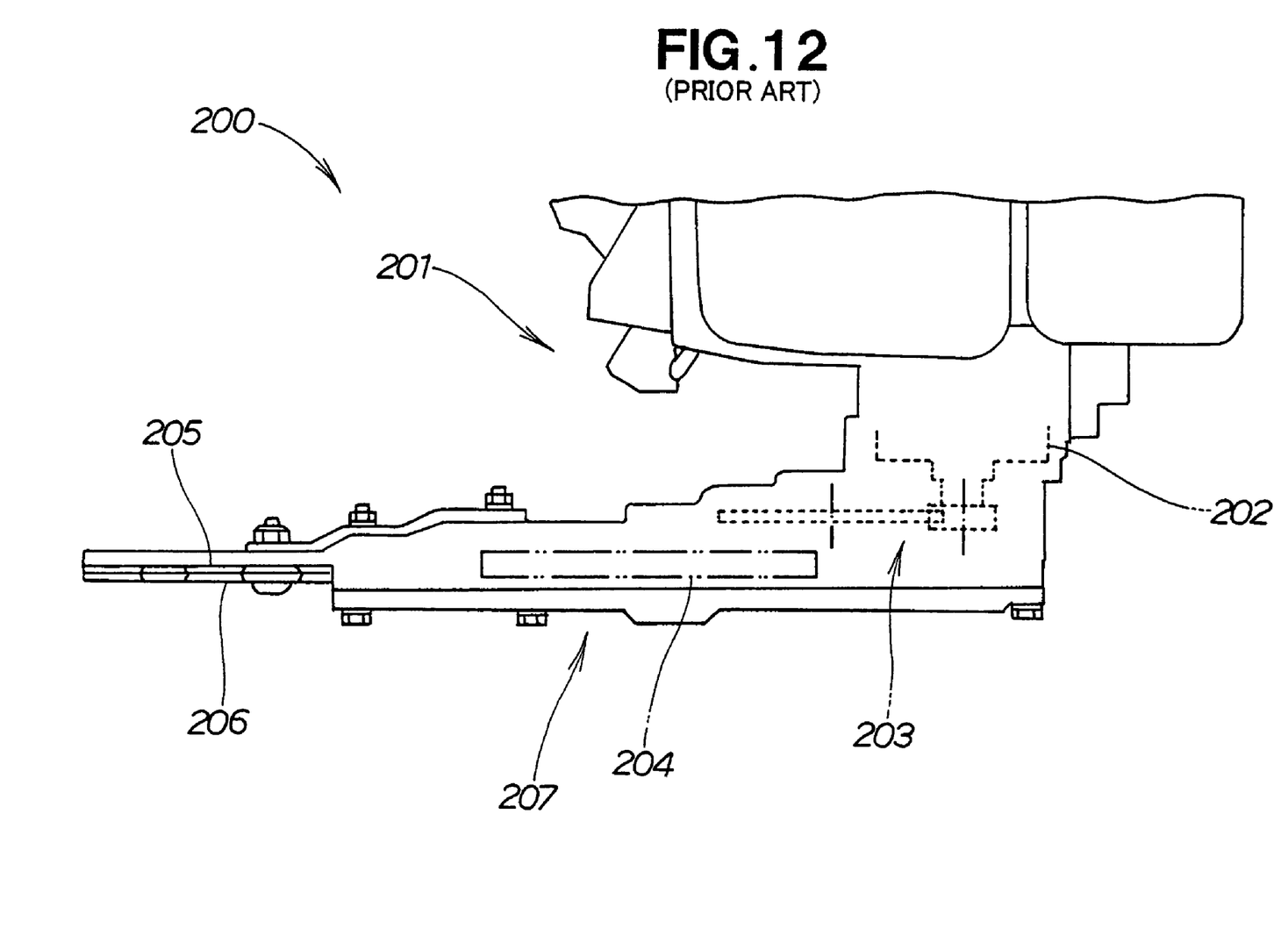
FIG. 12 is a schematic view showing a part of prior art portable working machine including a case in which a reduction mechanism and a motion conversion mechanism are accommodated.

As shown in FIG. 12 hereof, the disclosed portable working machine 200 includes a machine body 201, a motive power source 202 for producing a rotational motion, a reduction mechanism 203 connected via a centrifugal clutch (not shown) to the motive power source 202 for reducing speed of the rotational motion from the motive power source 202, and a motion conversion mechanism 204 connected to the reduction mechanism 203 for converting the rotational motion of reduced speed into linear reciprocating motion of a movable cutting blade 205 that is sidably movable relative to a stationary cutting blade 206 secured to a case 207.

The portable working machine 200 may be dropped onto the ground or roughly handled by the operator during use or transportation. In such instance, the case 207 may be damaged or broken due to an impact applied thereto. This may also cause a problem that a coupling structure provided between the motive power source and the reduction mechanism is also damaged or broken due to the effect of the impact force because the coupling structure including a clutch is susceptible to damage.

A further drawback associated with the known portable working machine 200 resides in that due to the presence of protrusions including heads of screw fasteners on a lower surface of the case 27, smooth sliding movement of the portable working machine on a cut or trimmed hedge surface cannot be achieved during a hedge trimming operation, resulting in a limited working efficiency of the portable working machine.

SUMMARY OF THE INVENTION

It is therefore an object of the present invention to provide a portable working machine, which is capable of protecting a case accommodating within it a power transmission mechanism from being damaged even when subjected to a shock force or impact, and also performing a hedge trimming operation with high efficiency.

According to one aspect of the present invention, there is provided a portable working machine comprising: a motive power source for producing a rotational motion; a cutting blade mounted to undergo linear reciprocating motion; a reduction mechanism for reducing a speed of the rotational motion produced by the motive power source; a motion conversion mechanism for converting the rotational motion with reduced speed into a linear reciprocating motion of the cutting blade; a case accommodating the reduction mechanism and the motion conversion mechanism therein and having a lower surface; a cover member disposed below the case for covering the lower surface of the case, the cover member including a first part connected to the lower surface of the case and a second part contiguous to the first part and extending to underlie a part of the lower surface of the case located below the reduction mechanism with a space defined between the part of the lower surface of the case and the second part of the cover member; and an impact-absorbing member disposed in the space between the part of the lower surface of the case and the second part of the cover member.

With this arrangement, when the second part of the cover member is subjected to an impact from below, the impact-absorbing member undergoes upward elastic deformation to absorb the impact for protecting the case from the impact.

In a preferred form of the present invention, the portable working machine further comprises a clutch disposed between the motive power source and the reduction mechanism for selectively connecting and disconnecting the motive power source and the reduction mechanism to make or block transmission of the rotational motion from the motive power source to the reduction mechanism, the impact absorbing member having a portion located within a projected area of the clutch as viewed from above.

The portion of the impact-absorbing member undergoes upward elastic deformation, when a portion of the second part of the cover member located within the projected area of the clutch is subjected to impact from below, to absorb the impact for preventing transmission of the impact to the clutch.

In a further preferred form of the present invention, the clutch has an axis of rotation, and the portion of the impact-absorbing member is disposed in vertical alignment with the axis of rotation of the clutch.

By undergoing upward elastic deformation to absorb the impact, the portion of the impact-absorbing member can effectively protect the clutch from being damaged by the impact.

Preferably, the second part of the cover member has a tip end, and the portion of the impact-absorbing member is disposed on the tip end of the second part of the cover member.

The tip end of the second part of the cover member is upwardly displaced by the greatest amount when subjected to impact. This upward displacement of the tip end causes the portion of the impact-absorbing member to upwardly deform by sufficient amount to absorb the impact for protecting the clutch efficiently.

In a further preferred form of the present invention, the impact-absorbing member is configured to substantially conform to a shape of the second part of the cover member. Thus, the impact-absorbing member fits with an inner peripheral surface of the second part of the cover member.

Preferably, the cover member has an outer surface facing in a direction away from the lower surface of the case, the outer surface being flat and smooth and forming an under surface of the portable working machine.

By virtue of the flat and smooth outer surface of the cover member, the portable working machine can smoothly slide over hedge or the like during a cutting operation. This results in increased efficiency of the cutting operation.

In a further preferred form of the present invention, the first part of the cover member is secured by screws to the lower surface of the case, the screws each having an enlarged head, the outer surface of the cover member being recessed to form screw-mounting seats for retaining thereon the heads of the respective screws, the recessed screw-mounting seats having a depth greater than a height of the heads of the screws.

Therefore, the head of each screw does not protrude from the outer surface of the cover member. By virtue of the outer surface of the cover member free from any protrusion, the portable working machine can smooth slide on hedge or the like during a cutting operation.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
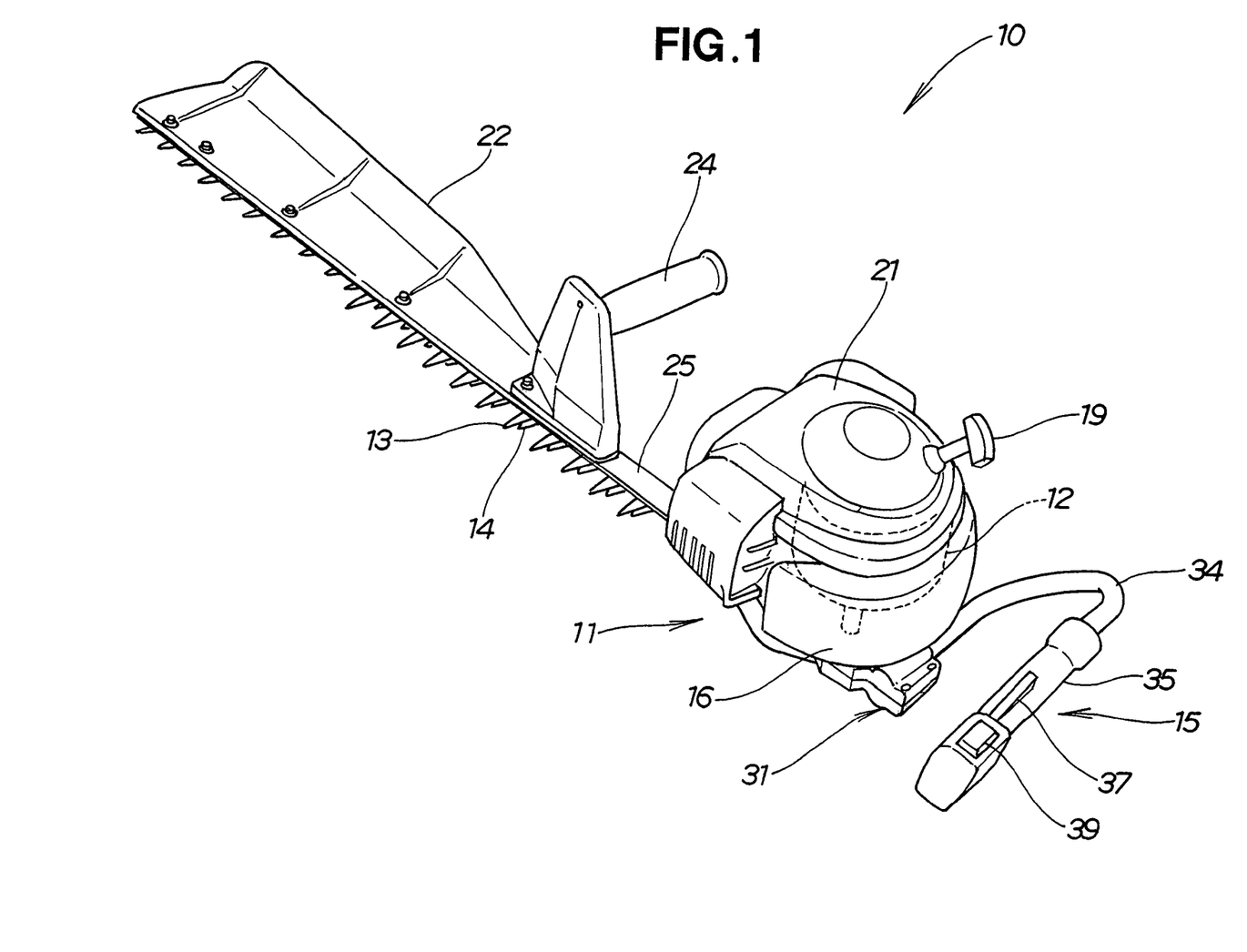
FIG. 1 is a perspective view of a portable working machine according to a first embodiment of the present invention.

FIG. 1 shows a portable working machine 10 according to a first embodiment of the present invention. The portable working machine 10 in the illustrated embodiment comprises a hedge trimmer used for trimming hedge and, for this particular application, the machine 10 is constructed so that a rotational motion produced by a motive power source (an engine) 12 is reduced in speed and then converted into linear reciprocating motions of upper and lower cutting blades 13, 14. Speed of the linear reciprocating movements of the blades 13, 14 is variable with engine speed that can be adjustably controlled by manipulating a throttle lever (described later) provided on a control handle 15.

As will be described later in greater detail, the hedge trimmer 10 has means or mechanism for effectively absorbing an impact that may be applied to a bottom of the hedge trimmer 10 when the hedge trimmer 10 is dropped on the ground or roughly handled during use or transportation. Additionally, the hedge trimmer 10 also has a flat and smooth undersurface, which allows the hedge trimmer to smoothly slide on a trimmed hedge surface during hedge trimming operation.

Figure 2:
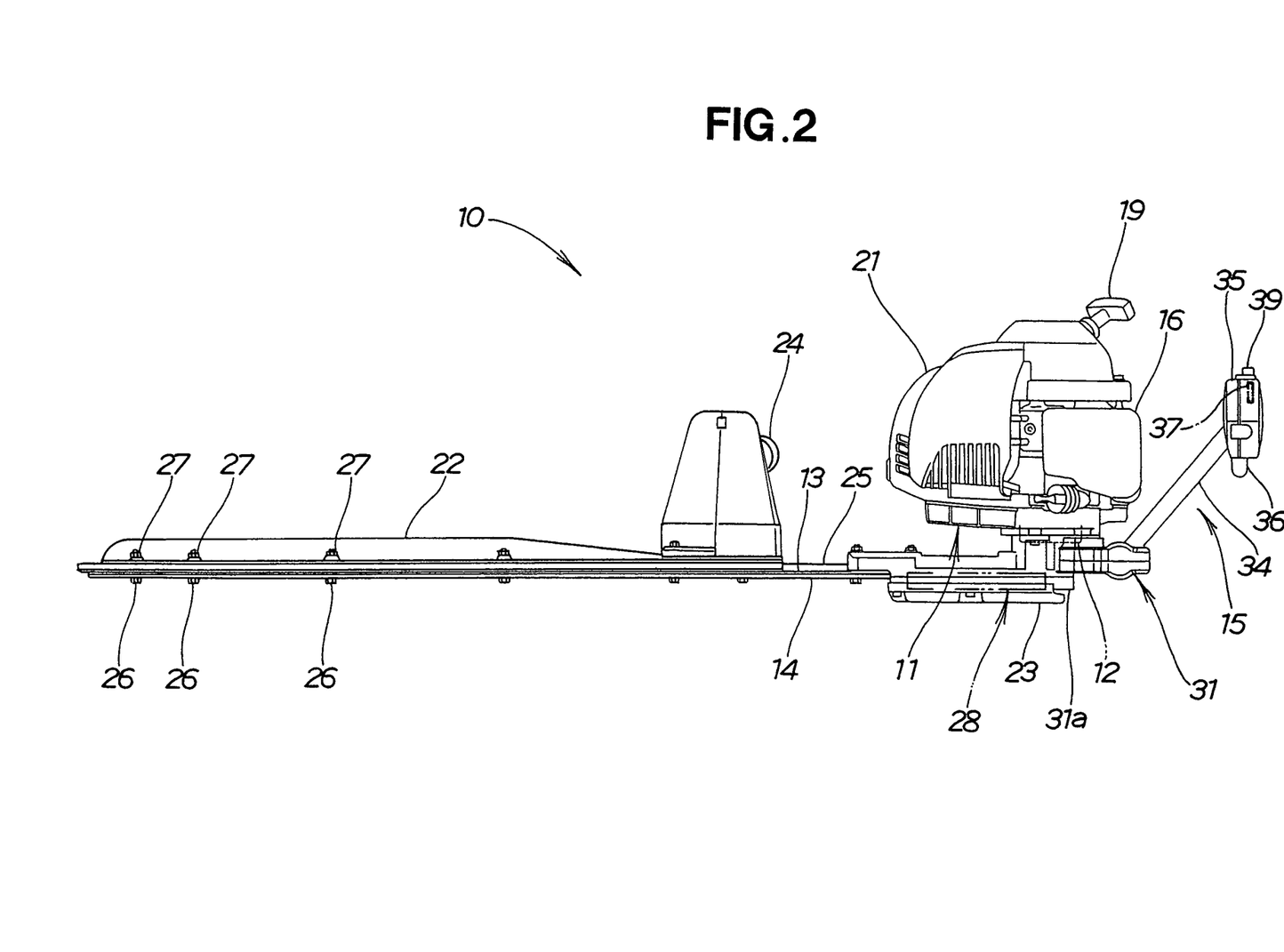
FIG. 2 is a side elevation view of the portable working machine of FIG. 1.

As shown in FIG. 2, the hedge trimmer 10 includes a machine body 11 on which the engine 12 is mounted, a motive power transmission mechanism 28 for transmitting a rotational motion from the engine 12 to the upper and lower cutting blades 13, 14, a case 31 attached to the machine body 11 and accommodating within it the motive power transmission mechanism 28, a support frame 25 attached to and projecting from the case 31 for supporting the upper and lower blades 13, 14 in such a manner that the blades 13, 14 can slide relative to each other along the length of the support frame 25, and a cover member 23 disposed below the case 31 for covering a lower surface 31a of the case 31. The operation handle 15 is attached to a rear part of the case 31. The support frame 25 has a middle portion on which a support handle 24 is provided for gripping by the operator. The support frame 25 has a front part to which a collection plate 22 is attached for collecting twigs or leaves cut by the cutting blades 13, 14. The machine body 11 is equipped with a fuel tank 16 for holding therein a fuel to be supplied to the engine 12, and a knob 19 of a recoil starter for manipulation by the operator to start the engine 12. The machine body 11 includes a cover 21 for covering the engine 12 and components disposed around the engine 12. As clearly shown in FIG. 1, the upper and lower cutting blades 13, 14 each comprise a relatively narrow elongated rectangular plate or band having a succession of cutting teeth provided on only one side edge (left side edge in the illustrated embodiment) thereof.

Reference numerals 26 and 27 shown in FIG. 2 denote attachment bolts and nuts, respectively, that are threadedly engaged together to attach the upper and lower cutting blades 13, 14 to the support frame 25 in such a manner that the blades 13, 14 can slide relative to each other along the length of the support frame 25.

The operation handle 15 includes a handlebar 34 extending from the case 31, a hand grip 35 attached to a distal end of the handlebar 34, a throttle lever 36 provided on the hand grip 35, a throttle lock lever 37 for locking the throttle lever 36, and a start/stop switch 39 for making the engine 12 ready for starting, or stopping the engine 12. The handlebar 34 is formed from a pipe bent into a desired configuration. The throttle lock lever 37 and the start/stop switch 39 are provided on the hand grip 35.

Figure 3:
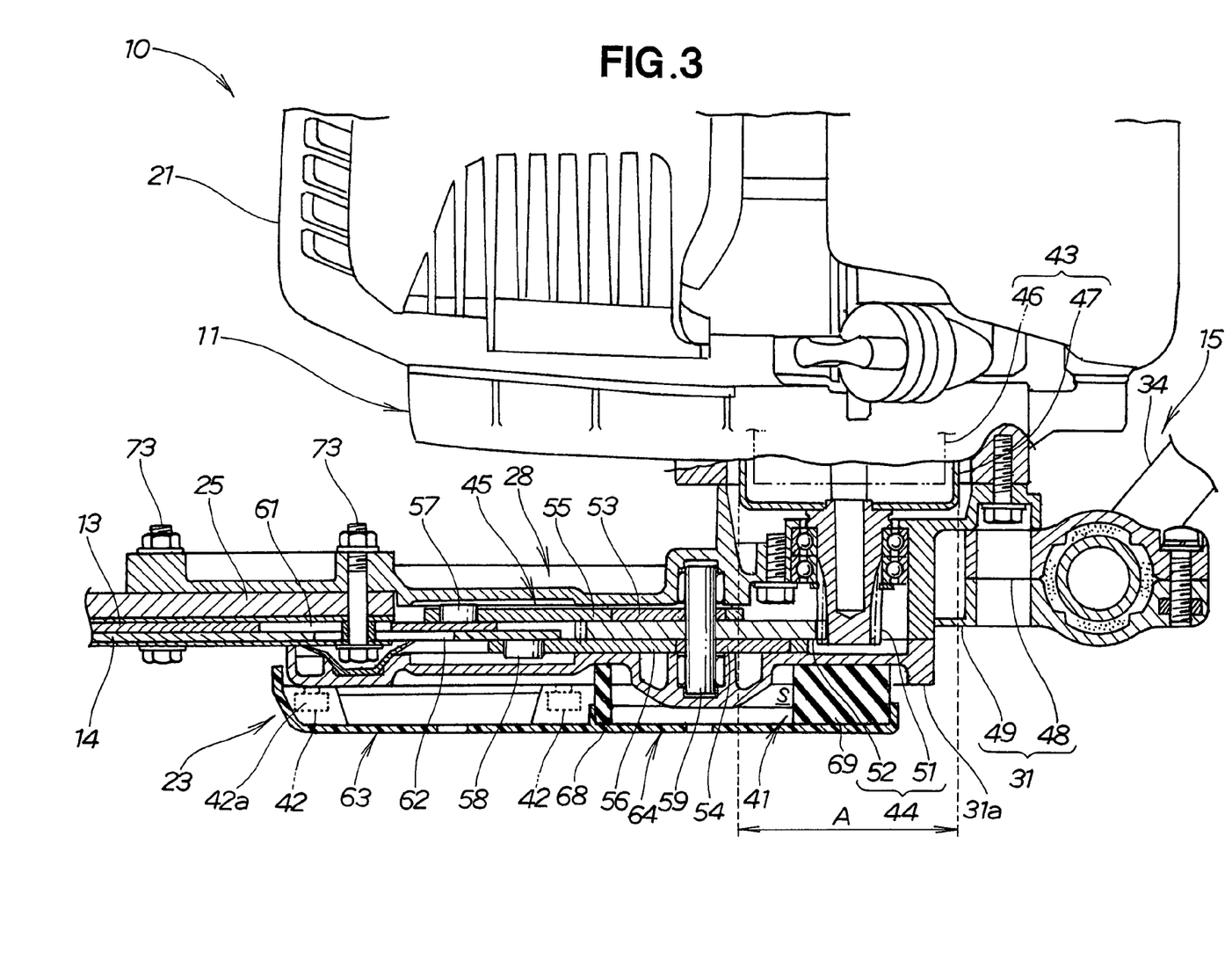
FIG. 3 is an enlarged fragmentary side elevation view of the portable working machine with parts shown in cross-section.

As shown in FIG. 3, the cover member 23 is formed from a synthetic resin and is resiliently deformable. The cover member 23 is formed by a first part (front part on the left side in FIG. 3) 63 fixedly secured by screws 42 to the lower surface 31a of the case 31 and a second part (rear part on the right side in FIG. 3) 64 contiguous to the front part 63 and extending to underlie the lower surface 31a of the case 31 with a gap or space S defined therebetween. An impact-absorbing member 41 is disposed within the space S for absorbing an impact applied to the rear part 64 of the cover member 23.

The cover member 23 as a whole assumes the form of a cantilever that is fixedly secured at the front part 63 as one end thereof and hanging free at the rear part 64 as the other end thereof. When subjected to a force or impact applied from below, the rear part 64 of the cantilever-like cover member 23 can deflect upwardly toward the lower surface 31a of the case 31 to thereby force the impact-absorbing member 41 into elastic deformation through which the impact is absorbed.

The front and rear parts 63 and 64 of the cover member 23 are arranged such that the front part 63 lies under that part or area of the lower surface 31a of the case 31 which is located substantially below a motion conversion mechanism 45 of the motive power transmission mechanism 28 accommodated within the case 31, while the rear part 64 lies under that part or area of the lower case surface 31a which is located substantially below a reduction mechanism 44 of the motive power transmission mechanism 28. The impact-absorbing member 41 is disposed between the rear part 64 of the cover member 23 and the second-mentioned lower surface part of the case 31. This arrangement is particularly advantageous because a coupling structure between the reduction mechanism 44 and the motive power source (engine) 12 is located above the second-mentioned lower surface part of the case 31.

The motive power transmission mechanism 28 generally comprises a centrifugal clutch 43, the afore-mentioned reduction mechanism 44 and motion conversion mechanism 45. The centrifugal clutch 43 includes an inner clutch member 46 mounted on an output shaft (i.e., a crankshaft not shown) of the engine 12 for rotation therewith, and an outer clutch member 47 disposed concentrically around the inner clutch member 46. The outer clutch member 47 is connected to an input side of the reduction mechanism 44 so that when the clutch 43 is in the engaged state, a rotational motion produced by the engine 12 is transmitted via the clutch 43 to the reduction mechanism 44 and is reduced in speed by the reduction mechanism 44. The motion conversion mechanism 45 interconnects an output side of the reduction mechanism 44 and the upper and lower cutting blades 13, 14 for converting the rotational motion with reduced speed into linear reciprocating motions of the cutting blades 13, 14.

The case 31 comprises an upper case member 48 and a lower case member 49 connected together to form an internal space in which the clutch 43 in part, the reduction mechanism 44 and the motion conversion mechanism 45 are received. The upper case member 48 is attached by screws (not designated) to the machine body 11.

Figure 4:
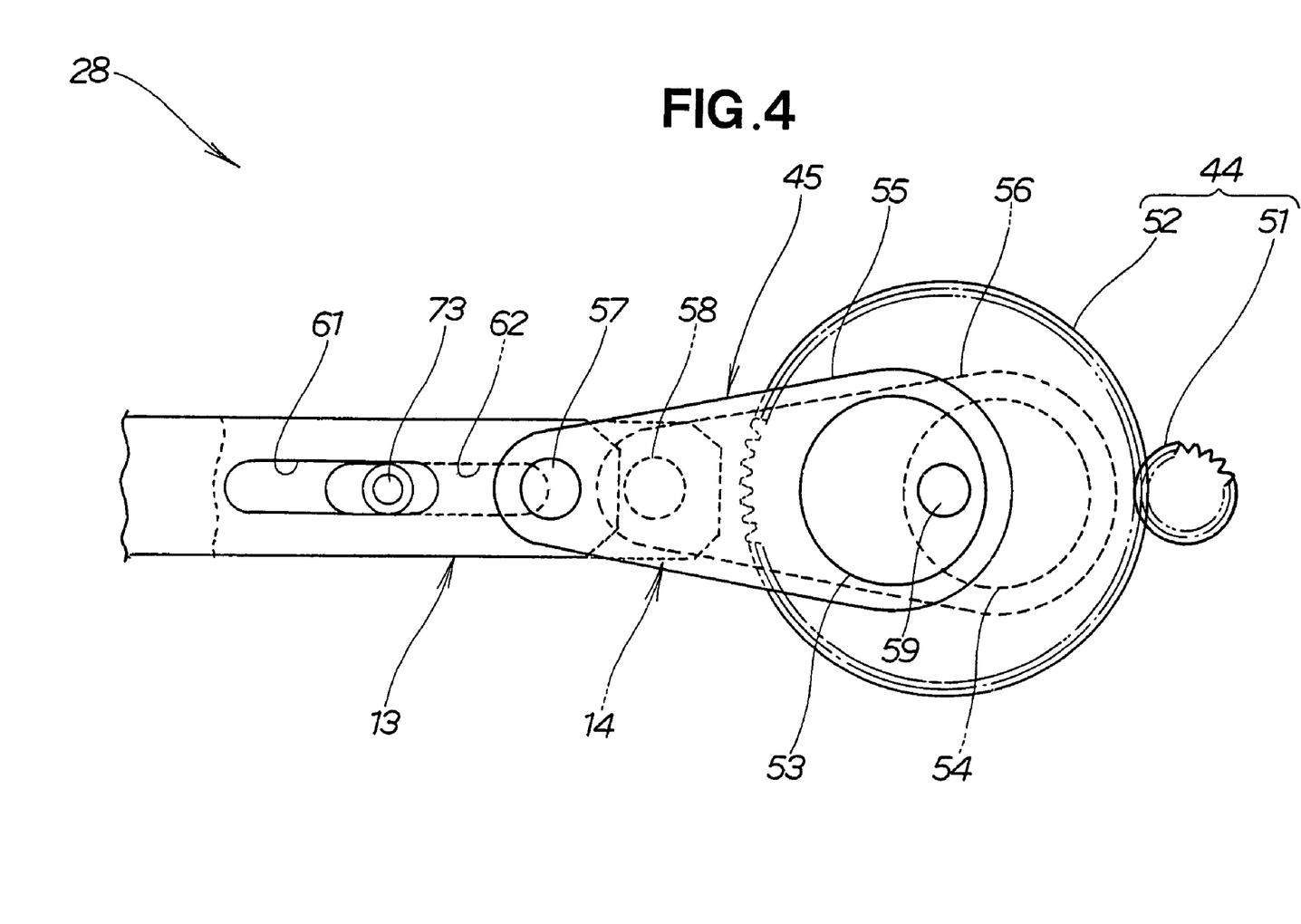
FIG. 4 is a plan view showing a reduction mechanism and a motion conversion mechanism of the portable working machine.

As shown in FIG. 4, the reduction mechanism 44 comprises a reduction gear having a pinion gear 51 connected to the clutch outer member 47 (FIG. 3) for rotation therewith, and a spur gear 52 meshing with the pinion gear 51 and mounted on a vertical shaft 59 rotatably supported within the case 31 (FIG. 3). The spur gear 52 has a larger diameter and a greater number of gear teeth than the pinion gear 51 so that the reduction mechanism 44 provides a reduction ratio, which is determined by the ratio of the number of gear teeth of the pinion gear 51 to the number of gear teeth of the spur gear 52.

The motion conversion mechanism 45 comprises upper and lower circular plate cams 53, 54 integrally connected to upper and lower surfaces of the spur gear 52, respectively, in eccentric relation to an axis of the central shaft 59, and upper and lower elongated link plates 55, 56 pivotally connected at one end (right end in FIG. 4) to the plate cams 53, 54, respectively. The upper circular plate cam (upper eccentric cam) 53 is disposed 180 degrees out of phase with the lower circular plate cam (lower eccentric cam) 54. The other end (left end in FIG. 4) of the upper link plate 55 is pivotally connected by a pin 57 to an end (proximal end) of the upper cutting blade 13, the pin 57 being formed integrally with the upper link plate 55. Similarly, the other end of the lower link plate 56 is pivotally connected by a pin 58 to an end (proximal end) of the lower cutting blade 14. The upper cutting blade 13 has an oblong hole or aperture 61 as indicated by a solid line in FIG. 4, and the lower cutting blade 14 has an oblong hole or aperture 62 as indicated by a broken line in FIG. 4. The oblong apertures 62, 63 extend longitudinally of the cutting blades 13, 14. A bolt 73 extends successively through the aperture 62 of the lower cutting blade 14, a body of the support frame 25 and the case 31 and is threadedly engaged with a nut, not designated (see FIG. 3). A combination of the bolt 73 and each of the apertures 61, 62 provides a guide function for allowing the respective blades 13, 14 to reciprocate along the length of the support frame 25. Although only one combination of the apertures 61, 62 and the bolt 73 is shown in FIG. 4, at least two such combinations are provided in this embodiment.

Now, operation of the motive power transmission mechanism 28, more specifically, operations of the upper eccentric cam 53 and the upper link plate 55 of the motion conversion mechanism 45 will be described with reference to FIG. 5A through FIG. 5D. Since the lower eccentric cam 54 and the lower link plate 56 operate in the same manner as the upper eccentric cam 53 and the upper link plate 55, description of the operation thereof will be omitted.

Figure 5A:
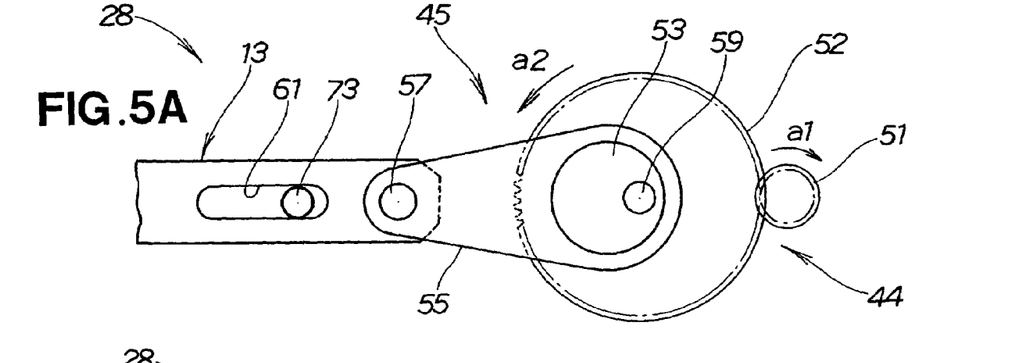
FIGS. 5A to 5D are views illustrative of the operation of the reduction mechanism and the motion conversion mechanism.

In FIG. 5A, when a rotational motion from the engine 12 (FIG. 2) is transmitted via the centrifugal clutch 43 (FIG. 3) to the pinion gear 51 of the reduction mechanism 44, the pinion gear 51 starts to rotate in a clockwise direction as indicated by the arrow a1 to thereby rotate the spur gear 52 in a counterclockwise direction as indicated by the arrow a2 at a lower speed than the pinion gear 51. Rotation of the spur gear 52 causes the upper eccentric cam 53 to revolve about the axis of the vertical shaft 59 in the same direction as the spur gear 52 because the upper eccentric cam 53 is integrally connected to the upper surface of the spur gear 52.

Figure 5B:
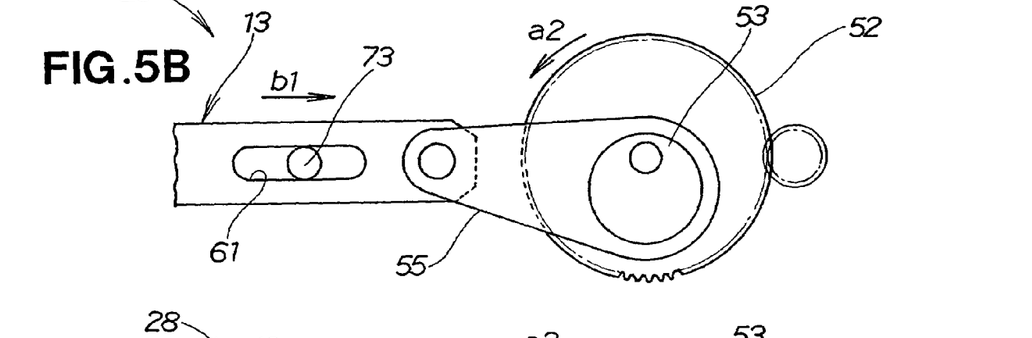

During that time, when the upper eccentric cam 53 angularly moves or turns about the axis of the vertical shaft 59 in the direction of the arrow a2 through 90 degrees apart from the position of FIG. 5A, the upper cutting blade 13 is pulled via the upper link plate 55 in a rightward direction as indicated by the arrow b1 shown in FIG. 5B.

Figure 5C:
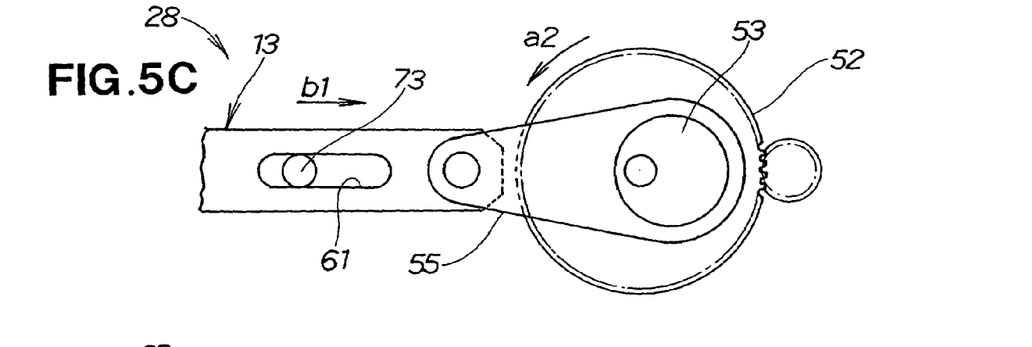

As the upper eccentric cam 53 further advances or turns counter-clockwise about the axis of the vertical shaft 59 through an angle of 90 degrees, the upper cutting blade 13 is further pulled via the upper link plate 55 in the rightward direction as shown in FIG. 5C.

Figure 5D:
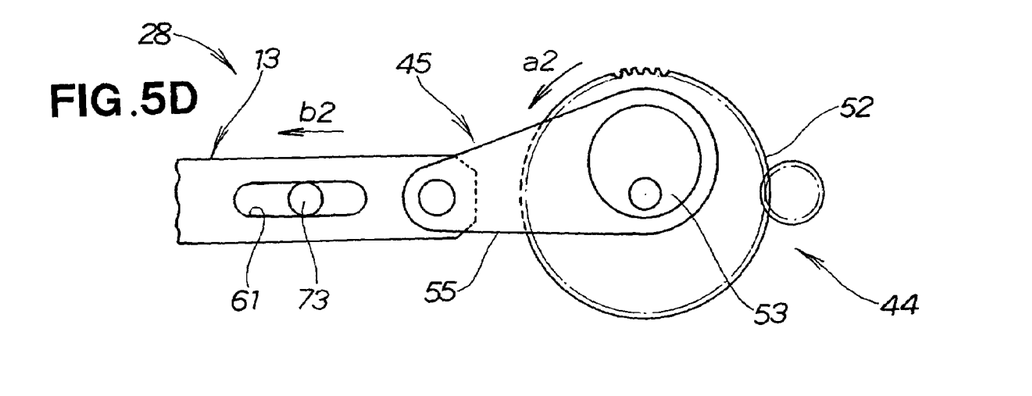

A continued counterclockwise turning movement of the upper eccentric cam 53 through an angle of 90 degrees causes the upper link plate 55 to push the upper cutting blade 13 leftward as indicated by the arrow b2 shown in FIG. 5D.

The upper cutting blade 13 is thus displaced right and left alternately via the upper link plate 55 in response to revolution of the upper eccentric cam 53 about he axis of the vertical shaft 59. In this instance, the bolt 73 and the oblong aperture 61 used in combination performs a guide function to allow the upper cutting blade 13 to slide linearly back and forth along the length of the support frame 25 (FIG. 3).

As discussed above, the eccentric cam 53 is integral with the spur gear 52 and disposed in eccentric relation to an axis of rotation of the spur gear 52 (namely, an axis of the vertical shaft 59). The eccentric cam 53 is pivotally connected to one end of the upper link plate 55, the other end of the upper link plate 55 being pivotally connected to the proximal end of the upper cutting blade 13. With this arrangement, when spur gear 52 rotates about the axis of the vertical shaft 59, the eccentric cam 53 and the end of the upper link plate 55 connected thereto revolve about the axis of the central shaft 59 with the result that the upper cutting blade 13 is driven by the upper link plate 55 to move linearly back and forth relative to the lower cutting blade 14. Thus, the rotational motion of the engine 12 that is reduced in speed by the reduction mechanism 44 is converted by the motion conversion mechanism 45 into the linear reciprocating motion of the upper cutting blade 13.

Figure 6:
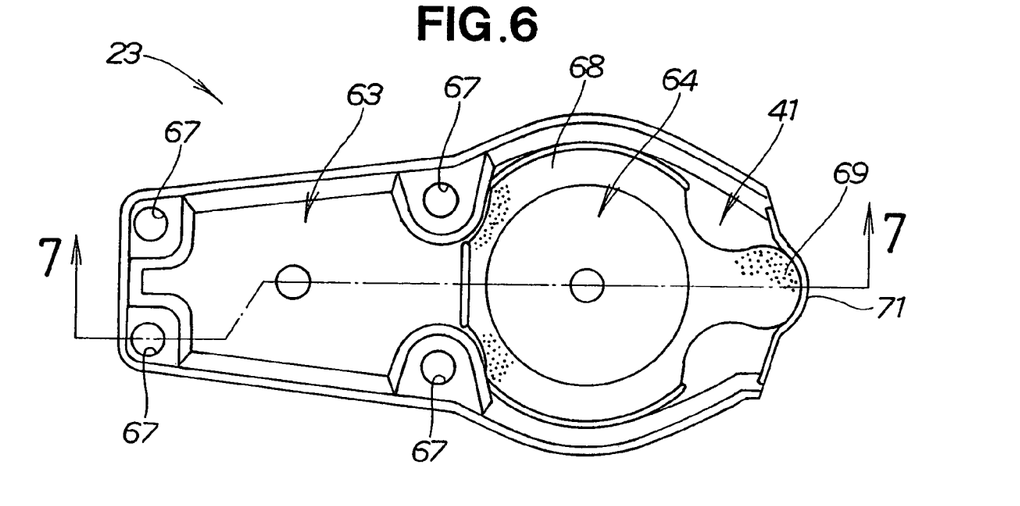
FIG. 6 is a top plan view showing the interior of a cover member of the portable working machine and an impact-absorbing member disposed in the cover member.
Figure 7:
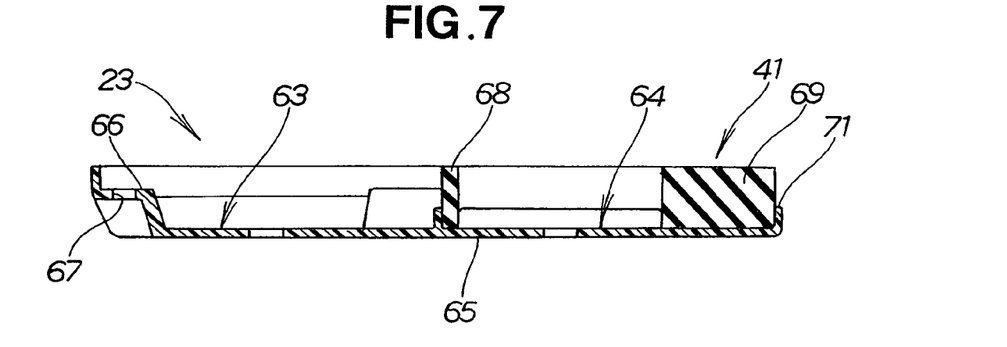
FIG. 7 is a cross-sectional view taken along line 7—7 of FIG. 6.
Figure 8:
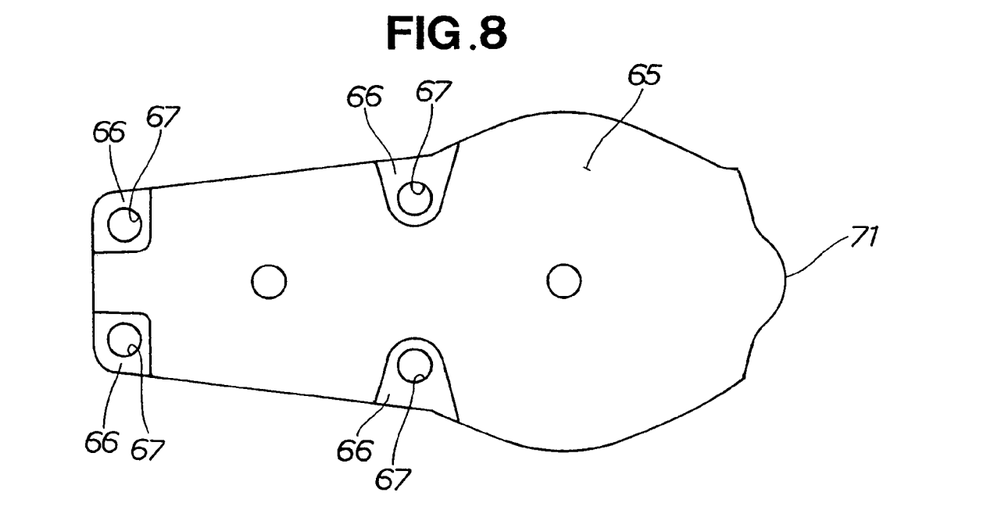
FIG. 8 is a bottom view of the cover member.

As shown in FIGS. 6–8, the cover member 23 has a generally dish-like configuration. The front part 63 of the cover member 23 is generally rectangular-shaped in configuration and the rear part 64 is generally oval-shaped in configuration. The cover member 23 has an outer surface 65 (FIG. 7), which faces outward or in a direction away from the lower surface 31b (FIG. 3) of the case 31 and forms an under surface of the hedge trimmer 10. The outer surface 65 of the cover member 23 (i.e., under surface of the hedge tripper 10) is flat and smooth.

The outer surface 65 is recessed to form four screw-mounting seats 66 that are located at respective corners of the rectangular-shaped front part 63 of the cover member 23. Each of the screw-mounting seats 66 has one circular hole 67 for the passage therethrough of a shank of the screw 42. The recessed screw-mounting seats 66 have a depth (or a distance from the outer surface 65 of the cover member 23) which is larger than a height of an enlarged head 42a (FIG. 3) of the screw 42 so that when the screws 42 is seated or retained on the respective screw-mounting seats 66, the heads 42a of the screws 42 do not protrude from the outer surface 65 of the cover member 23. By thus providing the protrusion-free flat and smooth outer surface of the cover member 23, the hedge trimmer 10 can smoothly slide on a trimmed hedge surface during hedge trimming operation, which will increase the efficiency of the hedge trimming operation.

The impact-absorbing member 41 is formed from an elastic material, such as chloroprene rubber (i.e., neoprene rubber), which is elastically deformable to absorb an impact that may be applied to the rear part 64 of the cover member 23 when the hedge trimmer 10 is dropped onto the ground or roughly handled during use or transportation.

As shown in FIG. 6, the impact-absorbing member 41 includes an annular portion 68 and a generally cylindrical portion 69 integral with and protruding from an outer circumferential surface of the annular portion 68. The impact-absorbing member 41 is configured to substantially conform to the shape of the rear part 64 of the cover member 23 so that the annular portion 68 and the cylindrical portion 69 fit with an inner peripheral surface of the rear part 64 of the cover member 23.

The annular portion 68, by virtue of its annular shape, can accommodate within it a downwardly protruding shaft-bearing portion (not designated) of the case 31 in a manner as shown in FIG. 3 and also can deform in a radial inward direction when compressed between the case 31 and the rear part 64 of the cover member 23. The cylindrical portion 69 protruding from the annular portion 68 is disposed on a tip end (rear end edge) 71 of the cantilever-like cover member 23 where the amount of deflection or resilient deformation of the rear part 64 of the cantilever-like cover member 23 becomes maximum. With the cylindrical portion 69 thus arranged, a force or impact applied to the rear part 64 of the cover member 23 can efficiently absorbed. It is preferable that the cylindrical portion 69 is located within a projected area A (FIG. 3) of the centrifugal clutch 43 as viewed from above and, more particularly, the cylindrical portion 69 is in vertical alignment with an axis of rotation of the pinion gear 51 on which the coupling structure including the clutch 43 is disposed. This arrangement is particular advantageous because the cylindrical portion 69 of the impact-absorbing member 41 can effectively suppress transmission of the impact from the cover member 23 to the coupling structure including the clutch 43, thereby protecting the coupling structure from being damaged.

Figure 9:
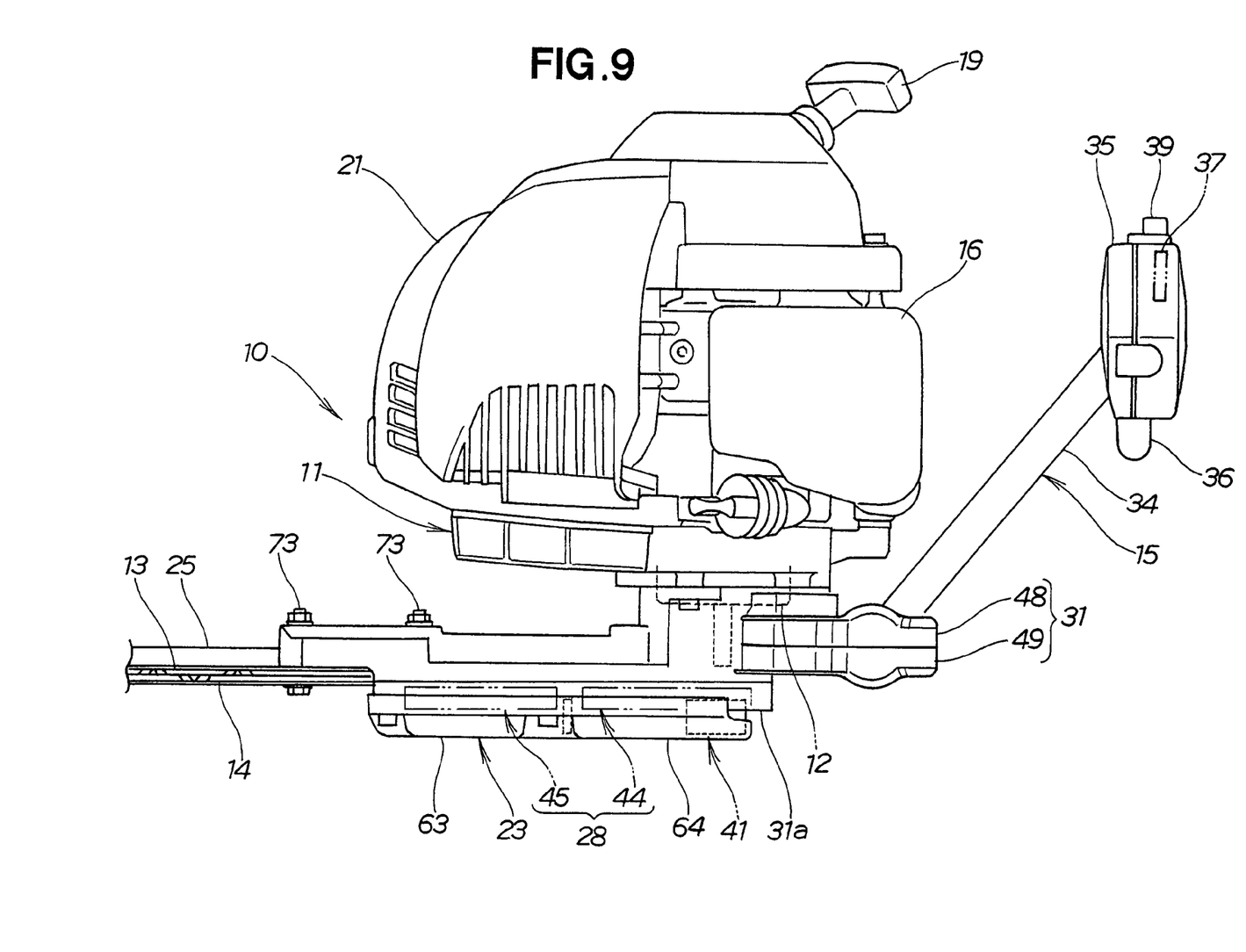
FIG. 9 is an enlarged view showing a part of the working machine of FIG. 2.

FIG. 9 is an enlarged view of a part of FIG. 2, showing essential structural components of the hedge trimmer (portable working machine) 10 that include the motive power source 12, the linearly reciprocally movable cutting blades 13, 14, the reduction mechanism 44, the motion conversion mechanism 45, the case 31, the cover member 23 and the impact-absorbing member 41.

Figure 10A:
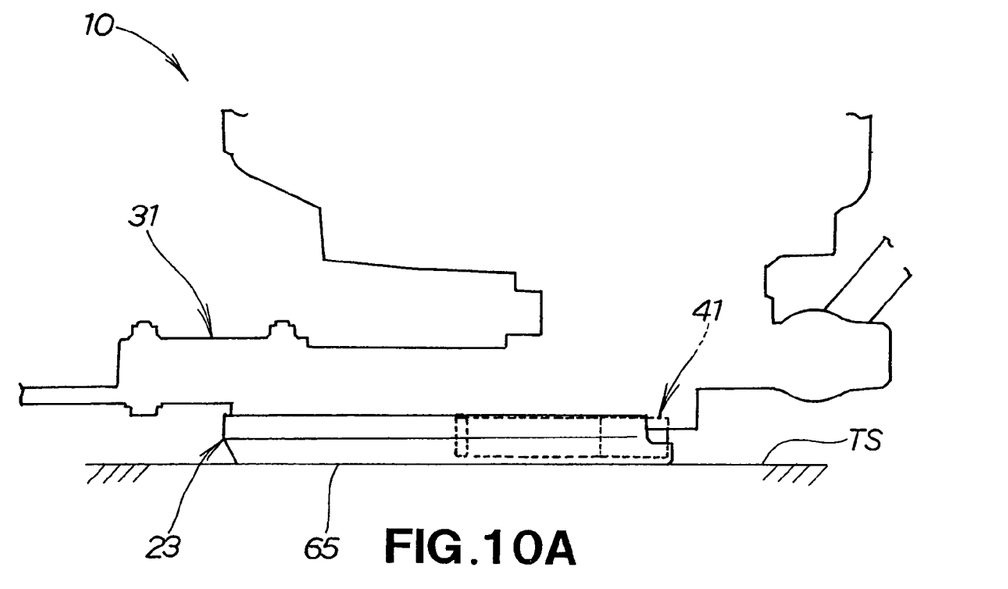
FIG. 10A is a diagrammatical view showing the portable working machine in an operating condition with its cover member being in sliding contact with a trimmed hedge surface.

As diagrammatically shown in FIG. 10A, by virtue of the flat outer surface 65 of the cover member 23 that forms the under surface of the hedge trimmer 10, the hedge trimmer 10 can smoothly slide on a trimmed hedge surface TS during hedge trimming operation. With this smooth sliding movement of the hedge trimmer 10, the hedge trimming operation can be achieved with high efficiency.

Figure 10B:
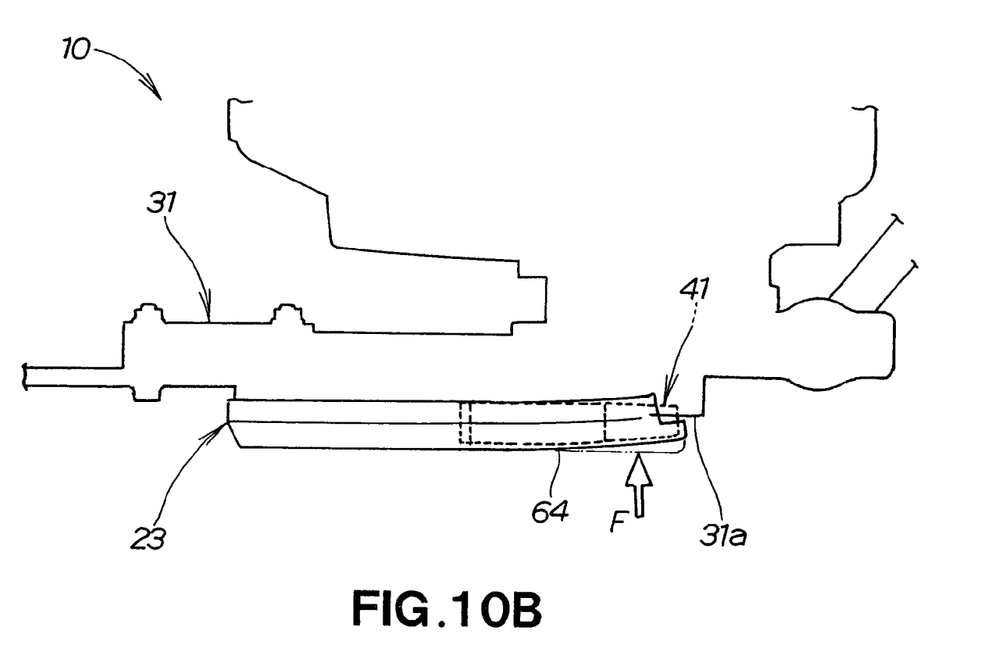
FIG. 10B is a diagrammatical view illustrative of the manner in which an impact applied to the cover member is absorbed through elastic deformation of the impact-absorbing member caused by deflection of part of the cover member.

FIG. 10B diagrammatically shows a condition in which the rear part 64 of the cover member 23 is displaced upward about its proximal end when subjected to a force or impact F applied thereto. In this instance, the impact-absorbing member 41 elastically deforms into a vertically compressed and horizontally extended configuration to thereby absorb the impact force.

Figures 11A, 11B:
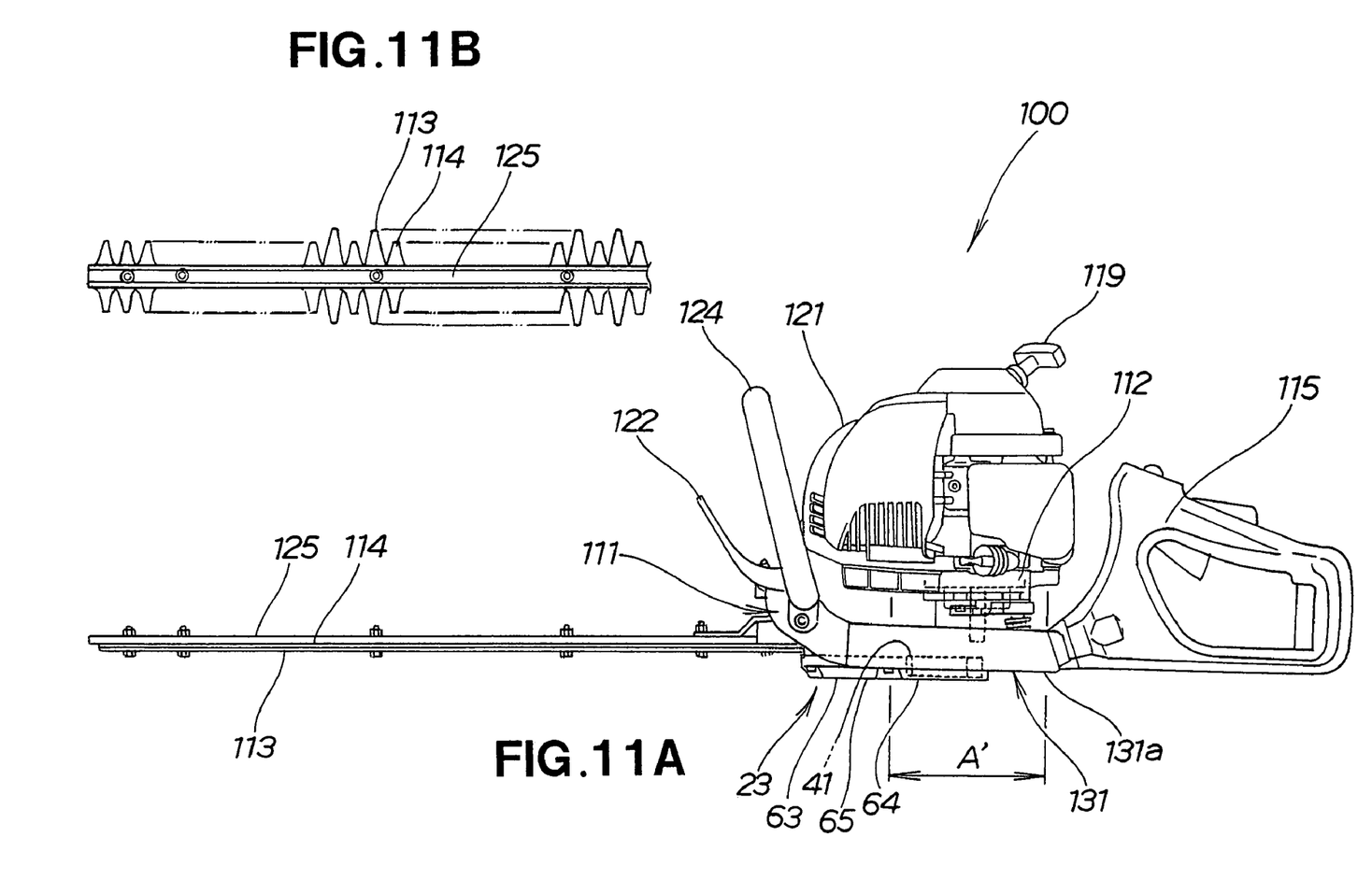
FIG. 11A is a side elevation view showing a portable working machine according to a second embodiment of the present invention.
FIG. 11B is a plan view showing upper and lower cutting blades and a support frame of the working machine of FIG. 11A.

FIG. 11A shows a hedge trimmer 100 as a portable working machine according to a second embodiment of the present invention. The hedge trimmer 100 differs from the hedge trimmer 10 of the first embodiment shown in FIGS. 1 to 10 in the structure of upper and lower cutting blades 114, 113 and also in the structure and arrangement of handles 115, 124. More specifically, the upper and lower cutting blades 114, 113 have cutting teeth disposed on both side edges thereof as shown in FIG. 11B. The handle 115 is rotatably mounted on a rear end of a machine body 111 of the hedge trimmer 100 for gripping by one hand of the operator. The handle 124 has a loop-shaped configuration and is fixedly connected to a front end of the machine body 111 for gripping by the other hand of the operator. The handle 124 is provided with a protector 122 disposed forward of the handle 124 for protecting the operator's hand from being damaged by twigs or leaves cut by the cutting blades 113, 114 during hedge trimming operation.

Regarding other respects, the hedge trimmer 100 is identical to the hedge trimmer 10. More specifically, the hedge trimmer 100 includes a motive power source (i.e., an engine) 112 mounted on the machine body 111, a cover 121 covering the engine 112 and components disposed around the engine 112, a case 131 attached to the machine body 111, a cover member 23 disposed below the case 131 for covering a lower surface 131a of the case 131, and a support frame 125 extending forward from the case 131 and supporting the cutting blades 113, 114 so that the cutting blades 113, 114 can slide relative to each other along the length of the support frame 125. The engine 112 can be started by pulling operation of a recoil starter knob 119. Reference character A' denotes a projected area of the motive power source 112 as viewed from above.

As previously discussed in the first embodiment, the cover member 23 has a flat and smooth outer surface 65 that forms an under surface of the hedge trimmer 10. The hedge trimmer 1 having such flat and smooth under surface can smoothly slide on a trimmed hedge surface during hedge trimming operation and thus improve the efficiency of the hedge trimming operation. The cover member 23 extends in the cantilever fashion with the front part 63 attached to the lower surface 131a of the case 131 and with the rear part 64 hanging free in a vertically spaced-apart relation to the lower surface 131a with a gap or space (not designated) defined herebetween. The impact-absorbing member 41 of elastic material is disposed in the space defined between the rear part 64 of the cover member 23 and the lower surface 131a of the case 131. The rear part 64 of the cover member 23 and the impact-absorbing member 41 are both located within the projected area A' of the motive power source 112.

When the operator accidentally drops the hedge trimmer 100 onto the ground, it may occur that the rear part 64 of the cover member 23 is deflected upward due to an impact applied thereto. In this instance, the impact-absorbing member 41 elastically deforms to thereby absorb the impact force. Since a coupling structure between the motive power source (engine) 112 and a reduction mechanism (not shown but identical to the one 44 shown in FIG. 3) received in the case 131 is located within the projected area A' of the engine 112 and vertically aligned with a cylindrical portion (not shown but identical to the one 69 shown in FIGS. 3 and 6) of the impact-absorbing member 41, the impact-absorbing member 41 can effectively suppress transmission of the impact from the rear part 64 of the cover member 23 to the coupling structure. Impact-induced breakage of the coupling structure can thus be prevented from occurring. This contributes to a prolonged service life of the hedge trimmer 100.

Although in the illustrated embodiments both the upper blade 13 and the lower cutting blade 14 are mounted to undergo linear reciprocating movement, either of the blades 13, 14 may be stationary.

Obviously, various minor changes and modifications of the present invention are possible in the light of the above teaching. It is therefore to be understood that within the scope of the appended claims the invention may be practices otherwise than as specifically described.

What is claimed is:

1. A portable working machine comprising:
   a motive power source for producing a rotational motion;
   a cutting blade mounted to undergo linear reciprocating motion;
   a reduction mechanism for reducing a speed of the rotational motion produced by the motive power source;
   a motion conversion mechanism for converting the rotational motion reduced in speed by the reduction mechanism into a linear reciprocating motion of the cutting blade;
   a case accommodating therein the reduction mechanism and the motion conversion mechanism and having a lower surface;
   a cover member covering the lower surface of the case, the cover member having a first part connected to the lower surface of the case and a second part contiguous to the first part and extending to underlie a part of the lower surface of the case located below the reduction mechanism with a space defined between the part of the lower surface of the case and the second part of the cover member, the cover member being in the form of a cantilever with the first part connected to the lower surface of the case and the second part hanging free in a vertically spaced-apart relation to the lower surface of the case; and
   an impact-absorbing member disposed in the space between the part of the lower surface of the case and the second part of the cover member.

2. A portable working machine according to claim 1; further comprising a clutch disposed between the motive power source and the reduction mechanism for selectively connecting and disconnecting the motive power source and the reduction mechanism to make or block transmission of the rotational motion from the motive power source to the reduction mechanism; and wherein the impact absorbing member has a portion located within a projected area of the clutch as viewed from above the clutch.

3. A portable working machine according to claim 2; wherein the clutch has an axis of rotation; and wherein the portion of the impact-absorbing member is disposed in vertical alignment with the axis of rotation of the clutch.

4. A portable working machine according to claim 3; wherein the second part of the cover member has a tip end; and wherein the portion of the impact-absorbing member is disposed on the tip end of the second part of the cover member.

5. A portable working machine according to claim 1; wherein the impact-absorbing member is configured to substantially conform to a shape of the second part of the cover member.

6. A portable working machine according to claim 1; wherein the cover member has an outer surface facing in a direction away from the lower surface fo the case, the outer surface being flat and smooth and forming an under surface of the portable working machine.

7. A portable working machine according to claim 1; wherein the first part of the cover member is secured by screws to the lower surface of the case, each of the screws having an enlarged head; and wherein the outer surface of the cover member is recessed to form screw-mounting seats for retaining thereon the enlarged heads of the respective screws, the recessed screw-mounting seats having a depth greater than a height of the heads of the screws.

8. A portable working machine according to claim 1; wherein the impact-absorbing member has an annular portion and a generally cylindrical portion integral with and protruding from an outer circumferential surface of the annular portion.

9. A portable working machine according to claim 8; wherein the annular portion and the cylindrical portion of the impact-absorbing member fit within an inner peripheral surface of the second part of the cover member.

10. A portable working machine according to claim 8; wherein the case has a shaft-bearing portion protruding in the direction of the cover member; the annular portion of the impact-absorbing member accommodates within it the shaft-bearing portion of the case.

11. A portable working machine according to claim 10; wherein the annular portion of the impact-absorbing member is formed of a deformable material for undergoing deformation in a radial inward direction when subjected to compression between the case and the second part of the cover member.

12. A portable working machine according to claim 8; wherein the cover member has a tip at the end which an amount of deflection or resilient deformation of the second part of the cover member becomes a maximum; and wherein the cylindrical portion of the impact-absorbing member is disposed on the tip end of the cover member so that a force or impact applied to the second part of the cover member is absorbed by the impact-absorbing member.

13. A portable working machine according to claim 1; wherein the impact-absorbing member is formed if an elastically deformable member; and wherein the impact-absorbing member is supported by the second part of the cover member so that when the second part of the cover member is subjected to a force or impact tending to displace the second part of the cover member in a direction toward the lower surface of the case about a proximal end of the cover member, the impact-absorbing member is elastically deformed into a vertically compressed and horizontally extended configuration to thereby absorb the impact force.

14. A portable working machine according to claim 1; wherein the space is defined between the second part and the lower surface of the case; and wherein the impact-absorbing member is disposed in the space between the second part of the cover member and the lower surface of the case and is formed of an elastically deformable material so that when the second part of the cover member is subjected to a force or impact in a direction toward the lower surface of the case, the second part of the cover member deflects toward the lower surface of the case to thereby force the impact-absorbing member into elastic deformation through which the impact is absorbed.

15. A portable working machine comprising:
a motive power source for producing a rotational motion;
a reduction mechanism for reducing a speed of the rotational motion produced by the motive power source;
a case accommodating therein the reduction mechanism and having a lower surface;
a cover member covering the lower surface of the case and having first part connected to the lower surface of the case and a second part contiguous to the first part and extending to underlie a part of the lower surface of the case located below the reduction mechanism with a space defined between the part of the lower surface of the case and the second part of the cover member, the cover member being in the form of a cantilever with the first part connected to the lower surface of the case and the second part hanging free in a vertically spaced-apart relation to the lower surface of the case; and
an impact-absorbing member formed of an elastically deformable material, the impact-absorbing member being disposed in the space between the second part of the cover member and the part of the lower surface of the case so that when the second part of the cover member is subjected to a force or impact in a direction toward the lower surface of the case, the second part of the cover member deflects toward the lower surface of the case to thereby force the impact-absorbing member into elastic deformation through which the impact is absorbed.

16. A portable working machine according to claim 15; further comprising a clutch disposed between the motive power source and the reduction mechanism for selectively connecting and disconnecting the motive power source and the reduction mechanism to enable or disenable transmission of the rotational motion from the motive power source to the reduction mechanism; and wherein the impact absorbing member has at least a portion disposed over the clutch.

17. A portable working machine according to claim 16; wherein the portion of the impact-absorbing member is disposed in vertical alignment with an axis of rotation of the clutch.

18. A portable working machine according to claim 15; wherein the impact-absorbing member has an annular portion and a generally cylindrical portion integral with and protruding from an outer circumferential surface of the annular portion.

19. A portable working machine according to claim 18; wherein the annular portion and the cylindrical portion of the impact-absorbing member fit within an inner peripheral surface of the second part of the cover member.

20. A portable working machine according to claim 18; wherein the cover member has a tip end where an amount of deflection or resilient deformation of the second part of the cover member becomes a maximum; and wherein the cylindrical portion of the impact-absorbing member is disposed on the tip end of the cover member so that a force or impact applied to the second part of the cover member is absorbed by the impact-absorbing member.

* * * * *